United States Patent [19]
Watanabe

[11] Patent Number: 4,762,213
[45] Date of Patent: Aug. 9, 1988

[54] DRIVING SYSTEM FOR A FOUR-WHEEL DRIVE VEHICLE

[75] Inventor: Kenichi Watanabe, Hiroshima, Japan

[73] Assignee: Mazda Motor Corporation, Hiroshima, Japan

[21] Appl. No.: 8,002

[22] Filed: Jan. 29, 1987

[30] Foreign Application Priority Data

Jan. 30, 1986 [JP] Japan .................................. 61-18580

[51] Int. Cl.$^4$ .................... F16D 25/063; F16D 43/25; F16D 43/28
[52] U.S. Cl. .................... 192/82 T; 180/233; 192/57
[58] Field of Search ........... 180/233; 192/82 T, 0.032, 192/57

[56] References Cited

U.S. PATENT DOCUMENTS

| | | | |
|---|---|---|---|
| 3,237,404 | 3/1966 | Flanigan et al. | 192/82 T X |
| 3,760,922 | 9/1973 | Rolt et al. | 192/111 B |
| 3,923,113 | 12/1975 | Pagdin | 192/82 T X |
| 4,022,084 | 5/1977 | Pagdin | 192/57 X |
| 4,031,780 | 6/1977 | Dolan et al. | 74/711 |
| 4,058,027 | 11/1977 | Webb | 192/57 X |
| 4,425,992 | 1/1984 | Makita | 192/82 T |
| 4,502,579 | 3/1985 | Makita | 192/82 T X |

FOREIGN PATENT DOCUMENTS

| | | | |
|---|---|---|---|
| 0140923 | 8/1982 | Japan | 192/82 T |
| 0140924 | 8/1982 | Japan | 192/82 T |
| 2093618 | 9/1982 | United Kingdom | 192/82 T |
| 2114252 | 8/1983 | United Kingdom | |

*Primary Examiner*—Rodney H. Bonck
*Attorney, Agent, or Firm*—Fleit, Jacobson, Cohn & Price

[57] ABSTRACT

A vehicle driving system including a hydraulic clutch having a plurality of friction members which are adapted to be forced into engagement with each other by a hydraulic pressure applied to a piston in the clutch. A control unit is provided to detect a condition of heat generation in the hydraulic clutch and relieving the hydraulic pressure to the clutch or increasing the hydraulic pressure to the hydraulic clutch when the condition of heat generation is out of an allowable limit.

9 Claims, 4 Drawing Sheets

DRIVING SYSTEM FOR A FOUR-WHEEL DRIVE VEHICLE

CROSS-REFERENCE TO THE RELATED APPLICATIONS

The present application is related to the application Ser. No. 901,776 filed on Aug. 29, 1986, now U.S. Pat. No. 4,709,775, and assigned to the same assignee of the present application.

BACKGROUND OF THE INVENTION

1. Field of the Invention

The present invention relates to a vehicle driving torque transmitting system, and more particularly to a system for transmitting a driving torque from a power plant to a vehicle wheel. More specifically, the present invention pertains to means for controlling the torque transmitted to the wheels in such driving torque transmitting system.

2. Description of the Prior Art

In a conventional torque transmitting system, it has been known to provide a slip clutch in a torque transmitting path to control the torque to be transmitted. In one type, there is interposed in the torque transmitting path a wet clutch which includes an input friction member and an output friction member which are forced into engagement under a fluid pressure. The capacity of the wet clutch of transmitting torque is dependent on the value of the fluid pressure so that the torque to be transmitted can be controlled by changing the fluid pressure forcing the friction members into engagement.

In another type, a viscous coupling is interposed in the torque transmitting path. The viscous coupling includes input and output friction plates which are located adjacent to each other with a viscous fluid interposed therebetween. One example of the torque transmitting system using such viscous coupling is shown in the U.S. Pat. No. 3,760,992. In the viscous coupling disclosed by the U.S. patent, the friction plates are formed with openings which determines the torque transmitting capacity. By changing the diameter of the openings, it is possible to obtain viscous couplings of different torque transmitting capacity.

It should be noted that in the conventional torque transmitting system there is always a certain extent of slip between the input and output friction members so that there is a possibility of temperature increase due to generation of heat under the slip movement. There will be no serious problem as long as the temperature increase is within an allowable limit, however, if there is an excessive slip, the temperature increase will be such that the friction plates are damaged under the heat.

SUMMARY OF THE INVENTION

It is therefore an object of the present invention to provide a driving torque transmitting system having transmitting torque control means which can control the torque transmitting capacity without having a danger of overheating.

Another object of the present invention is to provide a torque trnasmitting system in which the torque transmittal is controlled in accordance with the heat generated in the system.

According to the present invention, the above and other objects can be accomplished by a driving torque transmitting system including torque transmitting means disposed in a torque transmitting path from a power plant to a vehicle wheel, said torque transmitting means having friction members which are adapted to be brought into engagement with each other under a biasing force which determines a torque transmitting capacity of the torque transmitting means, control means operable in accordance with a predetermined control characteristics to adjust the biasing force within a control range so that a slip rate between the friction members is changed in accordance with the control characteristics, detecting means for detecting a condition of heat generation in the torque transmitting means, judging means for judging as to whether the condition of heat generation is in a predetermined heat generating range and producing an output representing that the condition of heat generation is in the predetermined heat generating range, biasing force adjusting means responsive to the output of the judging means for controlling the control means so that the biasing force is fixed to a value which is out of said control range and in which the heat generation is suppressed.

According to one aspect of the present invention, the fixed value of the biasing force is such that the torque transmittal is interrupted. In another aspect, the fixed value of the biasing force is such that the friction members are locked so that they rotate without slippage as a unit. Means may be provided to provide a first and second predetermined heat generating ranges so that the judging means makes a judgement as to whether the condition of heat generation is in either of the heat generating ranges.

The detecting means may detect the condition of heat generation in terms of the difference between the input and output speeds and the amount of the torque being transmitted. The torque transmitting system in accordance with the present invention can be advantageously applied to a four wheel drive motor vehicle. In that case, the torque transmitting system may be provided in the rear wheel drive system of the vehicle.

The above and other objects and features of the present invention will become apparent from the following descriptions of a preferred embodiment taking reference to the accompanying drawings.

DESCRIPTION OF THE PREFERRED EMBODIMENT

Figure 1:
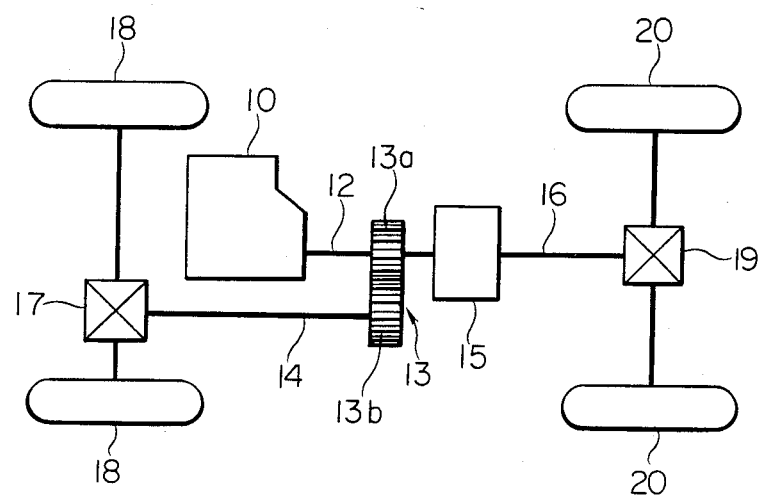
FIG. 1 is a diagrammatical plan view of a vehicle power transmitting system to which the present invention can be applied.

Referring to the drawings, particularly to FIG. 1, there is shown a four wheel drive vehicle drive system to which the present invention can be applied. The system includes a power plant 10 which may be an internal combustion engine or a transmission gear mechanism which transmit the engine output power. The power plant 10 has an output shaft 12 which carries a driving gear 13a of a transfer gear mechanism 13. The gear 13a is in meshing engagement with a driven gear 13*b* of the transfer gear mechanism 13. The driven gear 13*b* is provided on a front propeller shaft 14 which is connected through a final gear unit 17 such as a front differential gear unit with front wheels 18.

The output shaft 12 of the power plant 10 is further connected through a torque transmitting mechanism such as a hydraulic variable clutch 15 with a rear propeller shaft 16. The rear propeller shaft 16 is connected through a final gear unit such as a rear differential gear unit 19 with rear wheels 20. It will therefore be understood that a first torque transmitting path is provided by the power plant 10, the output shaft 12, the transfer gear mechanism 13, the front propeller shaft 14, the front differential gear unit 17 and the front wheels 18. A second torque transmitting path is provided by the power plant 10, the output shaft 12, the variable clutch 15, the rear propeller shaft 16, the rear differential gear unit 19 and the rear wheels 20.

Figure 2:
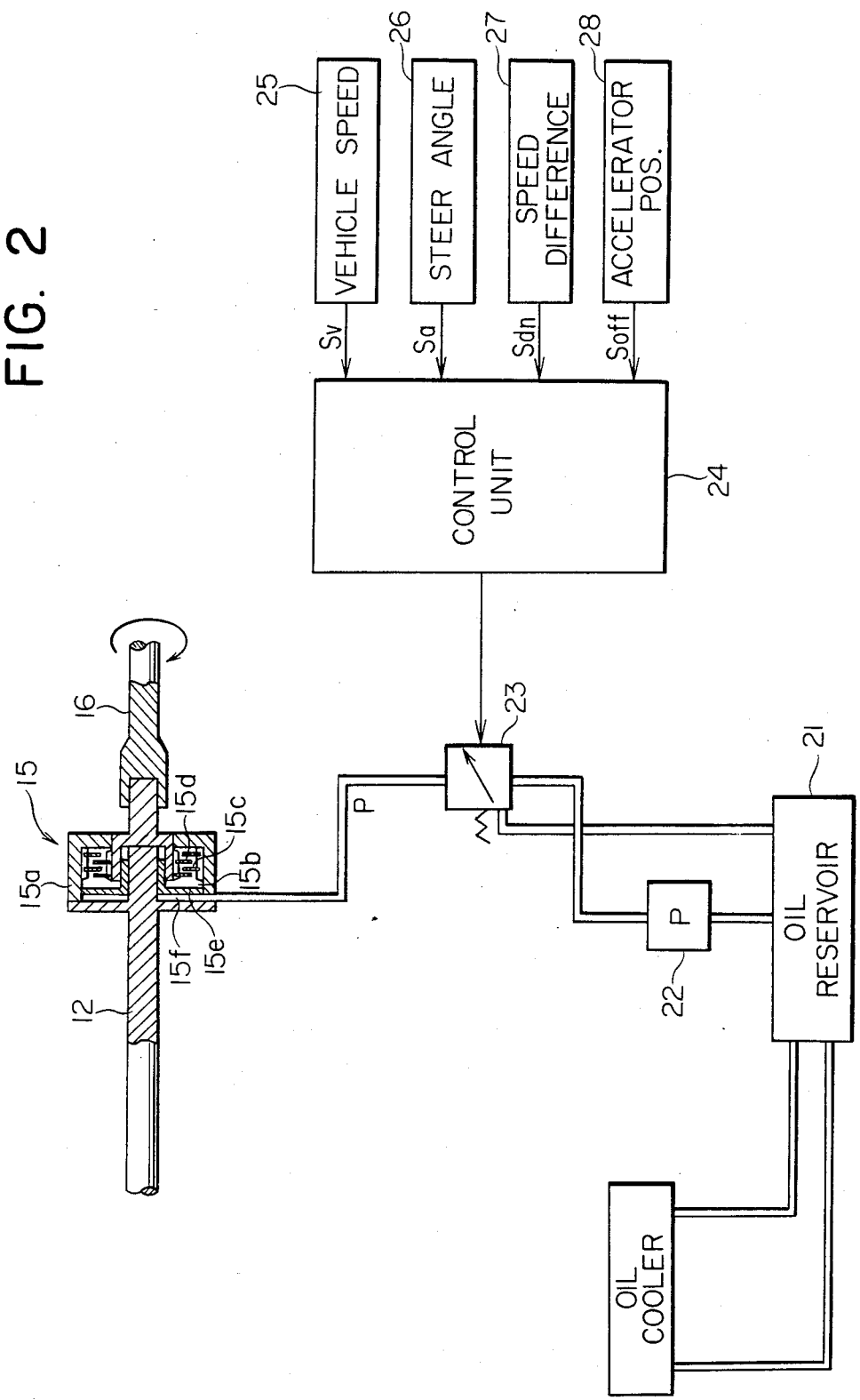
FIG. 2 is a diagrammatical illustration showing one embodiment of the present invention.

The variable clutch 15 is of a type in that the torque transmitting capacity can be adjusted by controlling the hydraulic pressure applied to the clutch 15. Referring to FIG. 2, it will be noted that the variable clutch 15 includes a casing 15*a* which is formed integrally with the output shaft 12 of the power plant 10 and defines a clutch chamber 15*b* in the casing 15*a*. The casing 15*a* is provided with a plurality of friction plates 15*c* projecting into the clutch chamber 15*b*. The rear propeller shaft 16 carries a plurality of fiction plates 15*d* which are interlaced with the friction plates 15*c* on the casing 15*a*. The friction plates 15*c* are carried on the casing 15*a* for axial movements and a piston 15*e* is provided in the casing 15*a* for forcing the friction plates 15*c* on the casing 15*a* into friction engagement with the friction plates 15*d* on the rear propeller shaft 16.

Behind the piston 15*e*, there is defined a hydraulic chamber 15*f* which is connected through a control valve 23 with a hydraulic pump 22. The hydraulic pump 22 draws hydraulic liquid from a hydraulic oil reservoir 21 and supplies the hydraulic oil under pressure to the control valve 23. The control valve 23 functions to adjust the hydraulic pressure applied to the hydraulic chamber 15*f* in the variable clutch 15. It will be understood that the slip rate between the friction plates 15*c* and 15*d* can be adjusted by changing the hydraulic pressure applied to the hydraulic chamber 15*f*.

In order to control the valve 23 so that the hydraulic pressure to the chamber 15*f* is appropriately controlled, there is provided a control unit 24. The control unit 24 is connected with a vehicle speed detector 25, a vehicle steering angle detector 26, a speed difference detector 27 and an engine accelerator pedal position detector 28 to receive signals therefrom. The vehicle speed detector 25 functions to detect the vehicle speed for example in terms of the rotating speed of the output shaft 12 of the power plant 10 and produces a vehicle speed signal Sv representing the vehicle speed. The steering angle detector 26 detects the vehicle steering angle and produces a steering angle signal Sa. The speed difference detector 27 functions to detect the speed difference between the shafts 12 and 16 and produce a speed difference signal Sdn. The engine accelerator pedal position detector 28 detects that the engine accelerator pedal is in the minimum output position and produces an accelerator off signal Soff. The speed difference detector 27 may be substituted by a rear propeller shaft speed detector which detects the rotating speed of the rear propeller shaft 16. The speed difference maythen be calculated in the control unit 24 from the speed signal Sv and the rear propeller shaft speed signal.

The control unit 24 has a map which determines values of control current i depending on the vehicle speed, the vehicle steering angle and the speed difference between the shafts 12 and 16. The control unit 24 functions to calculate the control current i based on the input signals Sv, Sdn and Sa and applies the control current i to the control valve 23.

The control valve 23 is of a type that produces a hydraulic pressure which is proportional to the control current i. Thus, the hydraulic pressure applied to the hydraulic chamber 15*f* is controlled by the control current i. The clutch 15 is of a type in which the torque transmitting capacity is proportionally determined by the hydraulic pressure applied to the hydraulic chamber 15*f*. In the four wheel drive vehicle system as shown in FIG. 1, the torque transmitting capacity of the clutch 15 determines the torque split ratio between the front propeller shaft 14 and the rear propeller shaft 16 and the torque in the output shaft 12 of the power unit 10 is transmitted to the rear propeller shaft 16 in an amount corresponding to the transmitting capacity of the clutch 15.

Figure 3:
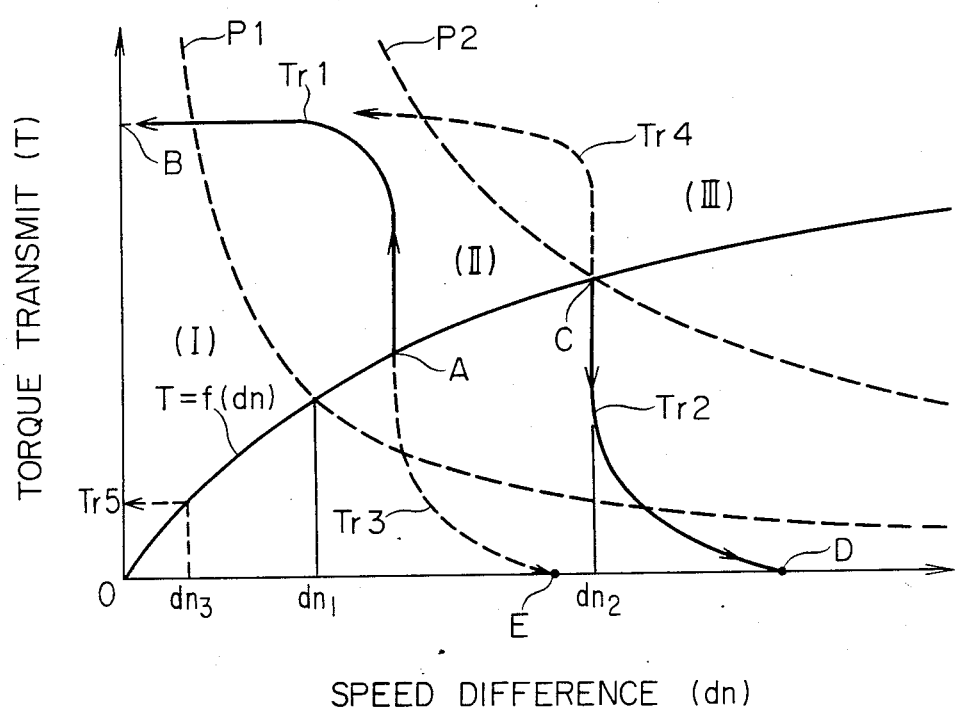
FIG. 3 is a diagram showing the relationship between the input and output speed difference and the torque being transmitted; and, FIG. 4 is a program flow chart showing the control in accordance with the embodiment of the present invention.

In the embodiment which is being described, the control current i is determined in accordance with the speed difference between the shafts 12 and 16 so that the relationship between the torque T transmitted through the clutch 15 and the speed difference dn becomes as shown by a solid line $T=f(dn)$ in FIG. 3. According to the features of the present invention, the torque transmittal through the clutch 15 is controlled in accordance with the condition of heat generation in the clutch 15. In the embodiment, assumption is made that the quantity of heat generated in the clutch 15 is proportional to the product of the speed difference and the torque transmitted through the clutch 15. In other words, the quantity of heat generation P can be represented by the formula $P=K(dn)(T)$. In FIG. 3, the safety limit of heat generation is shown by a line $P_1$ and the region (I) which is below the line $P_1$ shows the safety zone. The allowable limit of heat generation is shown by a line $P_2$. The region (II) which is between the lines $P_1$ and $P_2$ represents the region wherein the operation can be continued in a limited time. The region (III) which is above the line $P_2$ represents the dangerous zone.

In operation, the control current i is provided in accordance with the input signals Sv, Sdn and Sa as described previously, and the control valve 23 is controlled by the control current i. Thus, the hydraulic pressure to the clutch 15 is controlled and the torque transmitted through the clutch 15 is regulated so that the relationship between the torque and speed difference is changed as shown by the line $T=f(dn)$. When the operating condition goes into the region (II) as shown by the point A, count is made of a time t wherein the operation in the region (II) is continued. When the time t exceeds a predetermined value $t_1$, the control current i is increased so that the pressure to the clutch 15 is correspondingly increased to have the clutch 15 is directly connected. As the result, the shaft 12 is directly connected with the shaft 16. Although the torque transmitted through the clutch is increased as shown by a line Tr1 in FIG. 3, the operating condition is shifted back to the safety zone (I) and the operation is continued at the point B. It should be noted that the pressure to the clutch 15 may be relieved when the time t exceeds the predetermined value $t_1$ so that the clutch 15 is disengaged and torque transmittal is interrupted as shown by a line Tr3. The operating condition in this instance is shown by the point E. When the operating condition goes to a point C where the line T=f(dn) crosses the line P2. Then, the hydraulic pressure to the clutch 15 is relieved and the torque transmittal through the clutch 15 is interrupted as shown by a line Tr2. The operating condition in this instance is shown by a point D. Alternatively, the clutch 15 may be directly connected to shaft the operating condition to the point B as shown by a line Tr4.

In the control as shown in FIG. 3, the torque transmitted through the clutch 15 can be determined in relation to the speed difference in accordance with the curve T=f(dn). Therefore, it is possible to represent the condition of heat generation in terms of the speed difference dn or the slip ratio of the clutch 15. In FIG. 3, the speed difference $dn_1$ shows the upper limit of the safety zone (I) whereas the speed difference $dn_2$ shows the upper limit of the region (II) or the allowable limit of heat generation.

Figure 4:
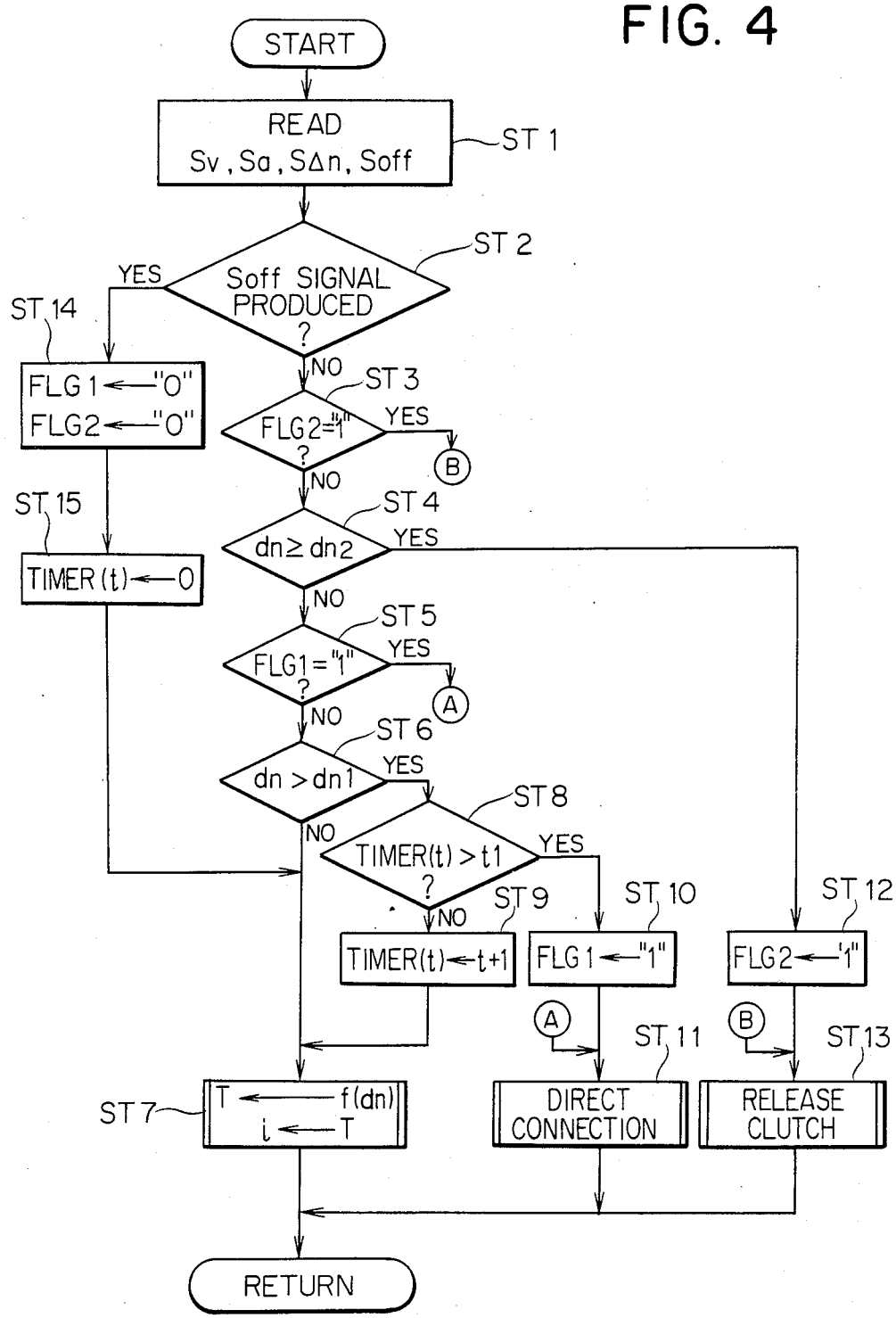

Referring now to FIG. 4, there is shown a flow diagram of the operation of the control unit 24 which may be constituted by a microprocessor. When the control unit 24 is initialized, the input signals Sv, Sa, Sdn and Soff are read in the step ST1 and a judgement is made in the step ST2 as to whether the accelerator off signal Soff is produced. When there is no signal Soff, it is judged that the accelerator pedal is actuated and the engine is producing an output to drive the wheels 18 and 20 and the step ST3 is carried out. In the step ST3, the position of the flag 2 is read. When it is judged that the flag 2 is not in the "1" position, a judgement is made in the step ST4 as to whether the actual speed difference dn is not smaller than the speed difference $dn_2$. If the result of the judgement is that the actual speed difference dn is smaller than the speed difference $dn_2$, the position of the flag 1 is read in the step ST5. If it is judged that the flag 1 is not in the position "1", the control current i is determined in the step ST7 so that the relationship between the speed difference dn and the torque T transmitted through the clutch 15 is established in accordance with the function T=f(dn) as shown in FIG. 3. For example, the control current i is determined to a value so that the torque Tr5 is transmitted through the clutch 15 to establish the speed difference $dn_3$.

When it is judged in the step ST6 that the actual speed difference dn is greater than the value $dn_1$, the count in the timer t is read in the step ST8. If the timer count is not greater than the value $t_1$, the value one is added to the timer count in the step ST9 and the step ST7 is then carried out. If the timer count is greater than the value $t_1$, the flag 1 is set to the position "1" in the step ST10 and the control current i is increased in the step ST11 so that the direct connection is established in the clutch 15. When it is judged in the step ST5 that the flag 1 is in the position "1", the step ST11 is carried out to establish the direct connection in the clutch 15. By directly connecting the clutch 15, it is possible to avoid overheating while maintaining the four wheel drive. When the clutch 15 is directly connected, the heat generation increases temporarily as shown by the line Tr1 in FIG. 3, however, overheating can be avoided in this operating range.

When it is judged in the step ST4 that the actual speed difference dn is greater than the value $dn_2$, the flag 2 is set to the position "1" in the step ST12 and the control current i is decreased in the step ST13 to thereby release the clutch 15. When it is judged that the flag 2 is already in the position "1" in the step ST3, the step ST13 is carried out to release the clutch 15. By immediately releasing the clutch 15, it is possible to decrease the heat generation as shown by the line Tr2 in FIG. 3 without any temporary increase in the heat generation.

If the judgement in the step ST2 is such that there is produced the signal Soff, it is judged that the engine throttle valve is in the minimum opening position so that no driving effort is given from the engine to the wheels 18 and 20. Then, the procedure goes from the step ST2 to the step ST14 wherein the flags 1 and 2 are set to the positions "0". Thereafer, the timer is set to "0" in the step ST15 and the step ST7 is then carried out.

It will be understood that, by the control procedure as described with reference to FIG. 4, it is possible to determine the torque transmitted through the clutch 15 so that the slip rate in the clutch 15 is changed as shown in FIG. 3 as long as the speed difference is smaller than the value $dn_1$. When the speed difference is between the values $dn_1$ and $dn_2$, the time of operation in this operating region is counted and the time count exceeds the value $t_1$ the clutch 15 is directly connected to avoid overheating of the clutch 15. If the speed difference dn exceeds the value $dn_2$, the clutch 15 is immediately disengaged.

The invention has thus been shown and described with reference to a specific embodiment, however, it should be noted that the invention is in no way limited to the details of the arrangements described but changes and modifications may be made without departing from the scope of the appended claims.

I claim:

1. A driving torque transmitting system including torque transmitting means disposed in a torque transmitting path from a power plant to a vehicle wheel, said torque transmitting means having friction members which are adapted to be brought into engagement with each other under a biasing force which determines a torque transmitting capacity of the torque transmitting means, the torque transmitting means having a first heat generating range wherein the heat generation in the torque transmitting means is within an allowable limit for continuous operation and a second heat generating range wherein the heat generation is higher than that of the first heat generating range but within a second allowable limit which is allowable for a predetermined time, control means responsive to heat generation conditions in the torque transmitting means for adjusting the biasing force in accordance with predetermined control characteristics so that a slip rate between the friction members is changed in accordance with the control characteristics when heat generation in the torque transmitting meansis in said first heat generating range, for adjusting the biasing force so that the slip rate of the torque transmitting means becomes substantially zero when heat generation within the torque transmitting means is out of the first heat generating range but within the second heat generating range within said predetermined time, and for adjusting the biasing force to a value wherein torque transmission through the torque transmitting means becomes substantially zero when heat generation within the torque transmitting means has been in the second heat generating range beyond said predetermined time or is beyond the first and second heat generating ranges.

2. A torque transmitting system in accordance with claim 1 in which said torque transmitting means includes hydraulic piston means for forcing the friction members into engagement with each other under said biasing force.

3. A torque transmitting system in accordance with claim 2 which includes valve means for regulating a hydraulic pressure to said piston means, said control means being means for supplying a signal for operating the valve means.

4. A torque transmitting system in accordance with claim 3 in which said control means is means for relieving the hydraulic pressure from said piston means to thereby fix the biasing force to a value wherein torque transmission through the torque transmitting means becomes substantially zero.

5. A torque transmitting system in accordance with claim 3 in which said control means is means for increasing the hydraulic pressure to said piston means to a maximum value to thereby fix the biasing force to a value wherein the slip rate between the friction members becomes substantially zero.

6. A torque transmitting system in accordance with claim 1 in which said torque transmitting means is provided in a rear wheel driving system for transmitting a driving torque from the power plant to rear wheels of a vehicle.

7. A torque transmitting system in accordance with claim 1 in which said control means includes means for detecting the condition of heat generation in terms of a difference between an input speed and an output speed of said torque transmitting means and the torque being transmitted through said torque transmitting means.

8. A four wheel drive vehicle including a power plant, front wheels located in a front part of the vehicle, rear wheels located in a rear part of the vehicle, a first torque transmitting mechanism for transmitting an output torque of said power plant to said front wheels, a second torque transmitting mechanism for transmitting an output torque of said power plant to said rear wheels, said second torque transmitting means including friction members which are adapted to be brought into engagement with each other under a biasing force which determines a torque transmitting capacity of the torque transmitting means, the torque transmitting means having a first heat generating range wherein the heat generation in the torque transmitting means is within an allowable limit for continuous operation and a second heat generating range wherein the heat generation is higher than that of the first heat generating range but within a second allowable limit which is allowable for a predetermined time, control means responsive to generation conditions in the torque transmitting means for adjusting the biasing force in accordance with predetermined control characteristics to adjust the biasing force so that a slip rate between the friction members is changed in accordance with the control characteristics when heat generation in the torque transmitted means is om said first heat generating range, for adjusting the biasing force so that the slip rate of the torque transmitting means becomes substantially zero when heat generation within the torque transmitting means is out of the first heat generating range but within the second heat generating range within said predetermined time, and for adjusting the biasing force to a value wherein torque transmission through the torque transmitting means becomes substantially zero when heat generation within the torque transmitting means has been in the second heat generating range beyond said predetermined time or is beyond the first and second heat generating ranges.

9. A four wheel drive vehicle in accordance with claim 8 in which said torque transmitting means is a hydraulic clutch of which slip rate between the friction members can be changed by a hydraulic pressure applied to the friction members.

* * * * *